US011262017B2

(12) United States Patent
Gavrilin

(10) Patent No.: US 11,262,017 B2
(45) Date of Patent: Mar. 1, 2022

(54) MODULAR HEAT INSULATION STRUCTURE FOR PIPELINES

(71) Applicant: JOINT STOCK COMPANY "EXPERIMENTAL AND DESIGN ORGANIZATION GIDROPRESS" AWARDED THE ORDER OF THE RED BANNER OF LABOUR AND CZSR ORDER OF LABOUR, Podolsk (RU)

(72) Inventor: Viktor Alekseevich Gavrilin, Moskovskaya obl. (RU)

(73) Assignees: Joint Stock Company "Experimertal and Design Organization "Gidropress" Awarded the Order of the Red Banner of Labour and Czar Order of Labour", Podolsk (RU); Joint Stock Company "Science and innovations" ("Science and innovations", JSC), Moscow (RU)

( * ) Notice: Subject to any disclaimer, the term of this patent is extended or adjusted under 35 U.S.C. 154(b) by 262 days.

(21) Appl. No.: 16/081,637

(22) PCT Filed: Oct. 27, 2017

(86) PCT No.: PCT/RU2017/000796
§ 371 (c)(1),
(2) Date: Aug. 31, 2018

(87) PCT Pub. No.: WO2018/147762
PCT Pub. Date: Aug. 16, 2018

(65) Prior Publication Data
US 2021/0215289 A1    Jul. 15, 2021

(30) Foreign Application Priority Data
Feb. 13, 2017 (RU) .......................... RU2017104488

(51) Int. Cl.
F16L 59/06 (2006.01)
F16L 9/18 (2006.01)
F16L 59/10 (2006.01)

(52) U.S. Cl.
CPC ................. *F16L 59/06* (2013.01); *F16L 9/18* (2013.01); *F16L 59/10* (2013.01)

(58) Field of Classification Search
CPC ......... F16L 59/00; F16L 57/10; F16L 57/185; F16L 59/06; F16L 9/18
(Continued)

(56) References Cited

U.S. PATENT DOCUMENTS 3,491,171 A * 1/1970 Walter .................. F16L 59/182
264/46.5
3,559,694 A * 2/1971 Vol .......................... F16L 59/16
138/147

(Continued)

*Primary Examiner* — Patrick F Brinson
(74) *Attorney, Agent, or Firm* — Brandon V. Zuniga; James R. Gourley; Carstens & Cahoon, LLP

(57) ABSTRACT

Modular heat insulation, manufactured as separate welded blocks of stainless corrosion-resistant steel, arranged on the pipeline outer surface. The boxes are filled with heat-insulating material and interconnected with quick-acting tension locks. The cover plates shield the block joints. A heat-insulating material being a set of minimum three corrugated or blistered shields is used. These shields are manufactured of stainless corrosion-resistant steel forming enclosed air cavities. The external lining sheets of the adjacent blocks are shorter than the blocks themselves by the size of the cover plates and are installed with a lateral ventilated gap from the external surface of the shield set. The cover plates shall have the shape of mated sections with a multilayer set of corrugated stainless corrosion-resistant steel sheets. The mated sections are quick-acting tension locks, and their cover plates have width overlapping the area of blocks' increased temperature within their joints.

4 Claims, 2 Drawing Sheets

Figure 3:
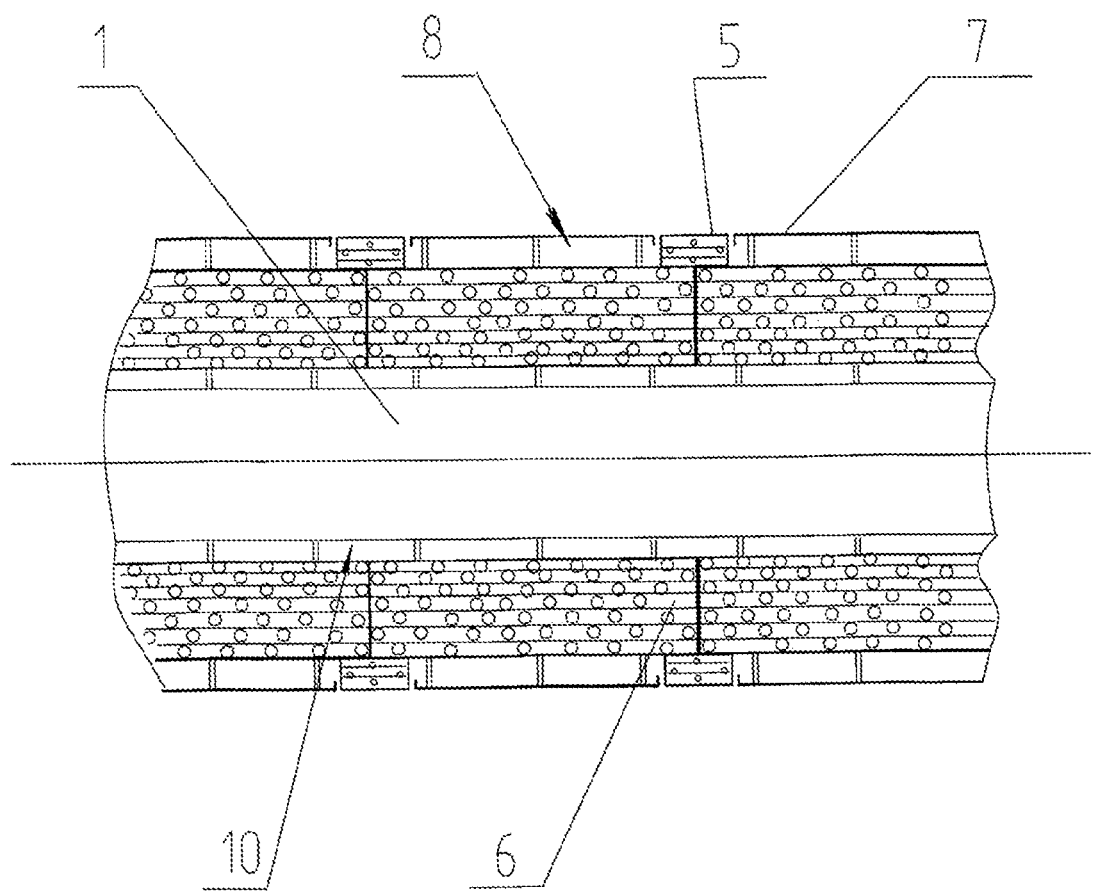

(58) Field of Classification Search
USPC .............. 138/149, 109, 148, 140, 137, 155
See application file for complete search history.

(56) References Cited

U.S. PATENT DOCUMENTS

| | | | | |
|---|---|---|---|---|
| 3,929,166 A * | 12/1975 | Westerheid | ........... | F16L 59/024 138/149 |
| RE28,930 E * | 8/1976 | Johnson | ................ | F16L 59/024 138/158 |
| 6,983,768 B1 * | 1/2006 | Vujic | .................... | F16L 59/024 138/119 |
| 7,578,315 B2 * | 8/2009 | Wilson | ...................... | F16L 9/02 138/112 |
| 7,637,289 B1 * | 12/2009 | Rapoport | .............. | F16L 59/028 138/149 |
| 9,068,582 B2 * | 6/2015 | Wolbert | ................. | F16L 59/14 |

* cited by examiner

Fig. 1
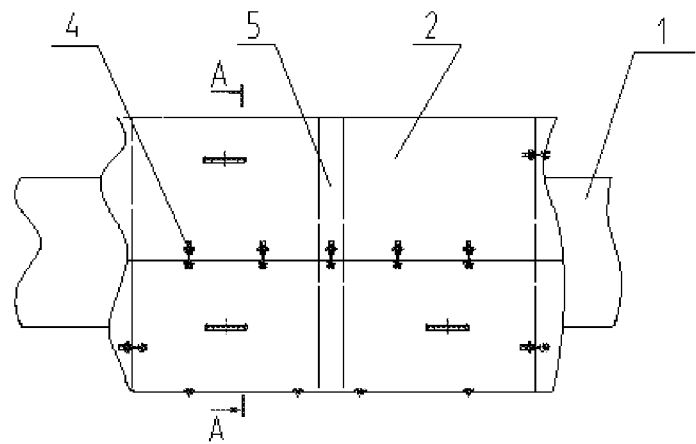
A − A
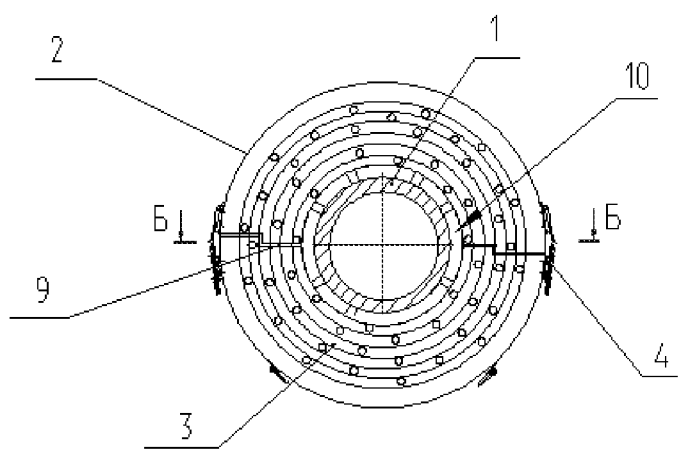
Fig. 2

MODULAR HEAT INSULATION STRUCTURE FOR PIPELINES

CROSS-REFERENCE TO RELATED APPLICATIONS

This application is a US 371 Application from PCT/RU2017/000796 filed Oct. 27, 2017, which claims priority to Russia Application 2017104488 filed Feb. 13, 2017, the technical disclosures of which are hereby incorporated herein by reference. The invention relates to nuclear power engineering, in the general—to heat-exchange equipment of nuclear power plants, in particular—to heat insulation of reactor unit pipelines and equipment.

The known technical solution (RF Patent No. 2219425, IPC F 16 L 59/06, priority 20 Nov. 2002) applies pipeline shields attenuating the heat transferring radiation.

The drawbacks of such structure are as follows:
complexity of arranging a large number of enclosed air cavities;
complexity of structure installation and repair;
impossibility to withdraw excessive heat.

A technical solution "High-temperature shield heat insulation" is known, wherein heat insulation is made in the form of a set of alternating corrugated and foil shields having different thickness (Application 2003106471/06, IPC F16L59/06, F16L59/08, 27 Sep. 2003).

The drawbacks of such structure are as follows:
open air cavities between the shields;
complexity of structure installation and repair;
one-piece structure;
absence of fastening elements;

The closest technical solution is "Modular removable heat insulation for equipment with a cylindrical part of surface" (RF Patent 2298131 F16L59/00, application: 2005108061/06, 23 Mar. 2005 г.), that includes separate blocks, manufactured as welded boxes of stainless corrosion-resistant steel and arranged on the pipeline outer surface. The boxes are filled with heat-insulating material and interconnected with quick-acting tension locks. The cover plates shield the block joints.

The drawbacks of the known structure, taken as prototype, are as follows:
hazard of fibrous material ingress in the RU circuit in case of block breakdown;
large material consumption for the structure;
impossibility to withdraw excess heat along the unit joints.

The said drawbacks are due to the fact that fibrous materials are used as heat insulation, moreover, the design does not provide excess heat withdrawal in block joints in the course of RU operation.

The said drawbacks are eliminated by the claimed structure.

The object of the invention is the creation of a heat insulation structure that provides the process parameters and safety during RU operation.

The technical effect of this invention is reduction of material demand for structure manufacturing, heat energy saving, simplification of structure installation and repair, exclusion of fibrous materials in the structure.

The technical effect is attained due to the modular heat insulation, manufactured as separate welded blocks of stainless corrosion-resistant steel and arranged on the pipeline outer surface. The boxes are filled with heat-insulating material and interconnected with quick-acting tension locks. The cover plates shield the block joints. It is suggested to use a heat-insulating material being a set of minimum three corrugated or blistered shields. These shields shall be manufactured of stainless corrosion-resistant steel forming enclosed air cavities. The external lining sheets of the adjacent blocks shall be shorter than the blocks themselves by the size of the cover plates and they shall be installed with a lateral ventilated gap from the external surface of the shield set. The cover plates shall have the shape of mated sections with a multilayer set of corrugated stainless corrosion-resistant steel sheets. The mated sections shall have quick-acting tension locks, and their cover plates shall have width overlapping the area of blocks' increased temperature within their joints.

As an option, the blocks may have an aligned ridge along the axial joint line.

As an option, the block joints may have a rough surface, in particular, blocks' joint faces may be made of corrugated stainless corrosion-resistant steel sheet.

As an option, the external length of the block may exceed the internal one by the temperature expansion value.

The blocks may have an installation option with a gap between the block and the pipeline.

The concept of the invention is explained by the drawing. FIG. 1 shows an overall view of pipeline modular heat insulation. FIG. 2 shows a sectional view of the heat insulation block. FIG. 3 shows a sectional view of modular heat insulation. The external surface of pipeline 1 holds blocks 2 in the form of welded boxes made of stainless corrosion-resistant steel, with heat-insulating material 3 placed inside, which are interconnected by quick-acting tension locks 4, thereat the block joints are closed with cover plates 5. Heat-insulating material is a set composed of minimum three corrugated or blistered shields 6 made of stainless corrosion-resistant sheet steel. The shields form enclosed air cavities. External lining sheets 7 of adjacent blocks 2 are shorter than the length of the blocks themselves by the size of cover plates 5 and are mounted with lateral open air gap 8 from the external surface of the set of shields 6. Cover plates 5 are made in the form of mated sections of a multilayer set of stainless corrosion-resistant corrugated sheet steel. The mated sections of cover plates are interconnected by quick-acting tension locks 4.

As an option, blocks 2 may have an aligned ridge along the line of axial joint 9.

As an option, block joints 9 may have a rough surface, in particular, blocks' joint faces 2 may be made of corrugated stainless corrosion-resistant steel sheet, that shall substantially reduce heat losses along the blocks' joint line.

As an option, the external length of block 2 may exceed the internal one by the temperature expansion value.

The blocks may have an installation option with gap 10 between the block and the pipeline.

The use of corrugated shields, made of stainless corrosion-resistant sheet steel, e.g. as per GOST 4986-79, allows for reducing block thickness and material consumption. Open ventilated air gap 8 ensures the required temperature of the external surface of blocks 2. The width of multilayer cover plates 5 overlaps the area of blocks' increased temperature in the place of their jointing, which also ensures the required temperature of the heat insulation surface.

Thus, the use of the claimed technical solution, as compared to the known structures, ensures reduced material consumption of the structure, reduced heat losses and simplified structure mounting and repair, omission of fibrous materials.

The invention claimed is:

1. A device for block heat insulation of a pipeline, the device comprising individual blocks in the form of welded boxes of corrosion-resistant stainless steel with an external lining sheet, heat insulation material inside the boxes, block joints between the blocks and pads, wherein the boxes are connected to each other by latches and the block joints are covered with the pads wherein the heat insulation material is a set of at least three corrugated or bubbly screens made of stainless sheet steel, wherein the external lining sheets of adjacent blocks of the individual blocks are shorter than a length of the adjacent blocks as such by the length of a corresponding pad for the adjacent blocks and the external lining sheets are installed with a side open ventilated air gap from an external surface of the set of at least three corrugated or bubbly screens, and wherein the pads are made in the form of sections made of a plurality of sheets of corrugated or bubbly steel sheet.

2. The device of claim 1, wherein the blocks have matched ledges along an axial joint line.

3. The device of claim 1, wherein the blocks are configured to be installed with an air gap from the pipeline.

4. The device of claim 1, wherein joint surfaces of the blocks are made of stainless corrosion-resistant corrugated or bubbly steel sheet.

* * * * *